United States Patent [19]

Harper et al.

[11] Patent Number: 4,776,989

[45] Date of Patent: Oct. 11, 1988

[54] METHOD AND APPARATUS FOR LIQUID FEED TO LIQIUD DISTRIBUTORS IN FLUID-LIQUID CONTACTING TOWERS

[75] Inventors: Stephen M. Harper, Lake Jackson; Roger L. Helms, Clute, both of Tex.

[73] Assignee: The Dow Chemical Company, Midland, Mich.

[21] Appl. No.: 7,149

[22] Filed: Jan. 27, 1987

Related U.S. Application Data

[63] Continuation of Ser. No. 533,312, Sep. 19, 1983, abandoned.

[51] Int. Cl.$^4$ .............................................. B01F 3/04
[52] U.S. Cl. ...................................... 261/97; 202/158; 239/193
[58] Field of Search ................. 261/94, 95, 97, 110, 261/112, 113, 26, 67, 114.1, DIG. 72; 202/158; 239/193

[56] References Cited

U.S. PATENT DOCUMENTS

| | | | |
|---|---|---|---|
| 2,197,935 | 4/1940 | Koolman | 261/97 |
| 3,158,171 | 11/1964 | Eckert | 261/97 X |
| 3,319,946 | 5/1967 | Fulton, Jr. | 261/26 X |
| 3,348,363 | 10/1967 | King, Jr. et al. | 261/26 X |
| 3,395,900 | 8/1968 | Meek | 261/97 X |
| 3,727,381 | 4/1973 | Kreimann | 261/97 X |
| 3,937,769 | 2/1976 | Strigle, Jr. et al. | 261/97 |
| 3,997,635 | 12/1976 | Hallgren | 261/112 X |
| 4,374,071 | 2/1983 | Regehr | 261/110 X |
| 4,432,913 | 2/1984 | Harper et al. | 239/193 X |
| 4,444,696 | 4/1984 | Harper et al. | 261/97 |
| 4,472,325 | 9/1984 | Robbins | 261/97 X |
| 4,476,069 | 10/1984 | Harper et al. | 261/97 |
| 4,689,183 | 8/1987 | Helms et al. | 261/97 |

*Primary Examiner*—Richard L. Chiesa

[57] ABSTRACT

Disclosed is a method and apparatus for alternatively feeding liquid to be distributed in a chemical process tower through a plurality of liquid distributors positioned at the same level within the tower. Very low flowrates with very uniform liquid distribution is achieved with this invention.

10 Claims, 5 Drawing Sheets

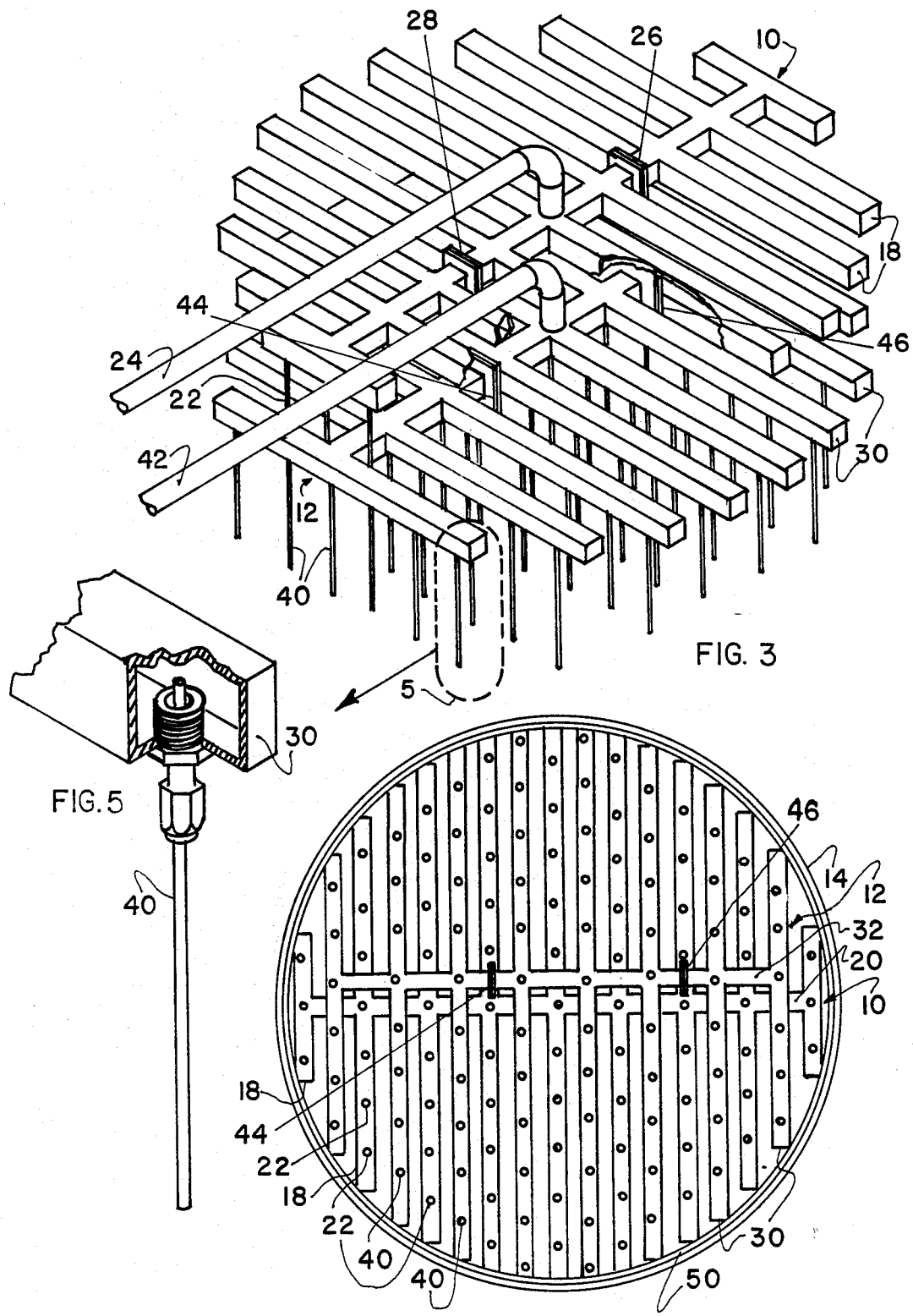

METHOD AND APPARATUS FOR LIQUID FEED TO LIQIUD DISTRIBUTORS IN FLUID-LIQUID CONTACTING TOWERS

RELATED APPLICATIONS

This patent application is a continuation of U.S. patent application Ser. No. 533,312, entitled "Method and Apparatus for liquid feed to Liquid Distributors in Fluid-Liquid Contacting Towers" filed Sept. 19, 1983 by Stepen M. Harper and Roger L. Helms, now abandoned.

BACKGROUND OF THE INVENTION

This invention relates to the distribution of liquid in liquid-fluid contact towers wherein liquid and fluid are desired to be intimately mixed, and wherein at least part of the liquid to be mixed is fed to the tower from a site which is located external to the tower interior.

The invention is particularly useful where very small amounts of liquid fed from an external source need to be very uniformly distributed at the same level in the tower. An example of this is the feeding of reflux liquid to a distillation tower.

Liquid distributors and redistributors are well known in several arts of manufacture. They are both used to disperse a liquid uniformly in process towers. Distributors are used when the liquid to be distributed is fed to the distributor from an outside source. Redistributors are used when the liquid source is internal to the tower, e.g., collecting and redistributing liquid which is flowing downwardly through a packed tower before it becomes unacceptably non-uniformly distributed. Such maldistribution often results from the liquid forming and following channels through the column packing or results from the liquid adhering to the tower wall.

The present invention is directed toward distributors as opposed to redistributors. However, the present invention certainly could be, and likely would often be, used in the same tower with redistributors.

The principal purpose for distributors, of course, is distribute the liquid fed to them as uniformly as possible across a given horizontally oriented, imaginary, cross-sectional area of the tower. Several limiting factors prevent this distribution from being uniformly perfect. One of these factors is that uniformly perfect liquid distribution would require the distributor to have an infinite number of distribution points. This, of course, is impossible. In fact, most distributors have no more than about 3 to about 7 distribution points per square foot of tower section.

Another limiting factor is that the distribution points are often restricted in the sites in which they can be located. This results from the requirement that the distributors have sufficient open space in them to allow fluids such as vapors to pass freely up or down through them while the distributor points are still spaced from one another in a substantially uniform pattern.

Yet another significant limiting factor in having commercially available distributors distribute their liquid uniformly across a section of a tower is the problem of the tower changing position after the distributor is installed. These commercially available distributors depend upon all of their distribution points being at exactly the same height within the tower. Their distribution is very sensitive to variations in heights between the distribution points. Thus even if one of these commercially available distributors is perfectly designed, is perfectly made, and is perfectly installed within the tower, its liquid distribution will deviate far from the desired uniform distribution by a slight tilting movement of the tower. Such movement often occurs as the tower foundation settles.

The present invention significantly reduces the problems posed by these and other limiting factors.

SUMMARY OF THE INVENTION

The present invention is a method and an apparatus for distributing liquid in a packed tower at a given level within the tower. It is capable of very uniform distribution at very low flow rates by utilizing more than one liquid distributor located substantially at that tower level in combination with the alternate feeding of the liquid to be distributed to these distributors.

With this invention the inventors have demonstrated the achievability of 30-40 distribution points per square foot.

STATEMENT OF THE INVENTION

The method of the present invention comprises alternately flowing the liquid to be distributed to a plurality of liquid distributors which are disposed at substantially the same height within a fluid-liquid contact tower. In the contact tower the liquid is mixed with a fluid which can be either gaseous or liquid in phase. Furthermore, the fluid with which the liquid is to be mixed may have a flow direction which can be either counter-current to or co-current with the flow direction of the liquid being distributed from the distributors.

At least the interior of one of the separate distributors is not in fluid communication with the interior of at least one of the other distributors in any manner such that liquid could freely flow between them. That is, they are not in fluid communication with one another. Preferably none of the distributors are in fluid communication with each other.

Preferably, the liquid to be distributed is alternately flowed under pressure to two ladder-type distributors which are both disposed across the interior of the tower, and which are disposed sufficiently far enough one above the other to allow fluid to flow between them, but yet are both disposed close enough to one another to be situated substantially at the same height within the tower. In this preferred embodiment, the distributors are also disposed such that the spaced, rung-like distributor tubes of the upper ladder distributor are positioned vertically over the open spaces located between the spaced, rung-like distributor tubes of the lower distributor.

In this preferred embodiment it is also often desired to have pipelets extending downwardly into the tower from the interior of the spaced tubes. These pipelets extend into the interior of the tubes far enough so that any solid debris settling on the bottom of the tubes does not flow into the pipelets and plug them up. Similarly the pipelets do not extend into the tubes close enough to the tube tops so as to avoid having floating solid debris enter them and plug them. The presence of the pipelets is very helpful in achieving uniformity of distribution of the liquid, especially at very low flowrates; e.g., less than about 0.8 gallons per minute per square foot of tower area as measured by using the interior horizontal cross-sectional area of the tower taken just below the pipelets. These pipelets add an extra dimension of control to the flow of the liquid by the presence of their length. This length exerts a back pressure on the flowing liquid which is proportional to the length of the pipelet. Hence, the pipelet can be used to greatly moderate deviations in flow from the distributor which are present due to deviations in distributor levelness and deviations in diameter sizes of openings out in the distributor tubes. Of course, flow through an orifice is proportional to the second power of the diameter of the orifice, and, hence, deviations in the diameters of the orifices produce deviations in the flow which are proportional to the second power of the deviations in the diameter. The flow is thus very sensitive to diameter deviations. Hence, moderation of these flow deviations from specification is highly desirable. The pipelets provide this moderating effect.

The pipelets and tubes of both rung-like distributors of this preferred embodiment are co-ordinatingly spaced one from the other so that the pipelets of both ladder-type distributors are spaced at substantially the same distance from one another. The pipelets are also uniformly sized in length as well as in their interior cross-sectional area so as to better control the amount of liquid distributed from each of them.

An alternative embodiment of the method of this invention is to alternately flow the liquid to be distributed not to overlapping separate distributors as described above, but rather to at least substantially non-overlapping separate distributors positioned over different regions of the tower interior's horizontal cross-sectional area at a height taken just below the distributors. These distributors are positioned at substantially the same height within the tower and are spaced above the cross-sectional area such that their collective distribution points are distributed in a substantially uniform pattern above the cross-sectional area. Usually this alternative embodiment would be desired to be used only in a tower having a large horizontal cross-sectional area.

In the situation where only two distributors are used in this alternative embodiment, then the interiors of the two distributors would not be in liquid communication with one another. The liquid to be distributed would be alternately fed first to one and then to the other distributor. When more than two distributors are employed in this alternative embodiment, then some of the liquid distributors may be in liquid communication with some of the others. However, all of these distributors can not be in liquid communication with each other; for then there could be no alternative liquid feeding of the distributors.

Of course, many schemes of alternate feeding are available when more than two distributors are used. For example, where four distributors are used the following three combinations of alternate feeding could be used: (1) The four could be fed sequentially one at a time, beginning again with the first after the last had been fed; or (2) two distributors could be fed while the other two were not being fed; or (3) conceivably, the feeding could alternate between feeding a group of three distributors at the same time and then feeding a single distributor.

The type of distributors used in this alternative embodiment are not limited to ladder-type distributors as they are in the preferred embodiment. Other types of distributors, such as the trough type or the pan orifice type, or the pan wier riser type can readily be used. Examples of these known prior art distributors are illustrated in FIGS. 7, 8, 9 and 10.

The apparatus of the present invention includes the apparatus described above in the description of the method of the invention. Additionally it includes means for alternately feeding the liquid to be distributed to the different distributors. Several feeding means can be used to accomplish this.

BRIEF DESCRIPTION OF THE DRAWINGS

The invention will be better understood by reference to the drawing wherein like reference numerals refer to like parts in the several figures and wherein:

FIG. 3 is an isometric view of the two overlapping ladder-type liquid distributors of FIGS. 1 and 2.

FIG. 4 is a bottom view of the preferred distributors 10, 12 in tower 14 of FIGS. 1, 2, 3 as seen along line 4—4 in FIG. 1 and which shows the combined positioning of the distributor tubes 18, 30 and their respective distribution point pipelets 22, 40 in a manner so as to provide a uniform distribution pattern of the combined pipelets of both distributors.

FIG. 5 is an enlarged, broken-away, isometric view of the end of one of the distributor tubes as shown encircled by broken line 5 in FIG. 3.

Figure 1:
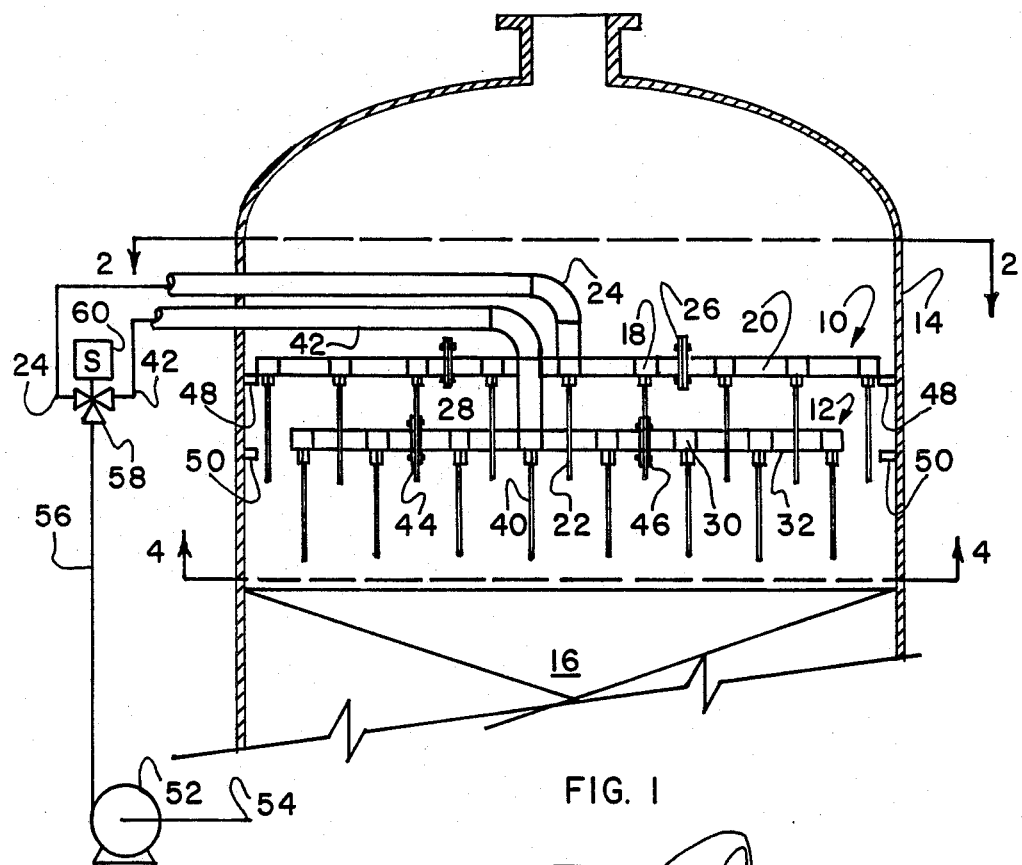
FIG. 1 is a side view of part of a packed tower 14 showing the preferred embodiment of the distributors 10, 12 in the tower and showing the preferred alternating feeding means in schematic form.
Figure 2:
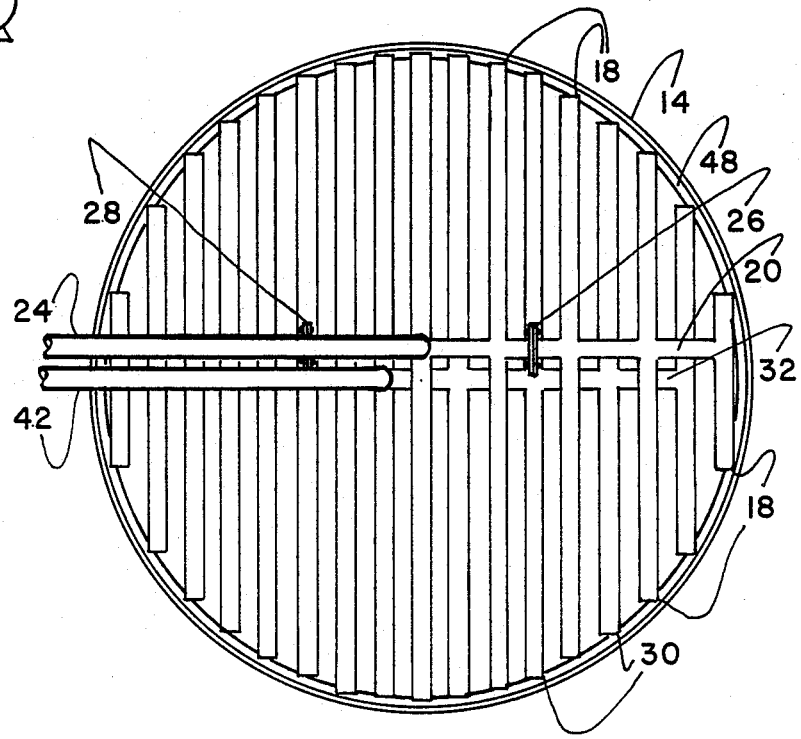
FIG. 2 is a top view of the preferred embodiment of the distributors of this invention taken along line 2—2 in FIG. 1.

The distributors illustrated in FIGS. 7-10 are commercially available from the Norton Company of Akron, Ohio.

DETAILED DESCRIPTION OF THE PREFERRED EMBODIMENT OF THE INVENTION

Referring to FIGS. 1-5, a pair of ladder-type distributors 10, 12 can be observed within packed, vapor-liquid contact tower 14. Distributors 10 and 12 are seen to be positioned over a bed of column packing 16. Although the two distributors 10, 12 are situated at substantially the same height within tower 14, distributor 10 is seen to be spaced above and overlapping distributor 12.

Distributor 10 has rung-like distributor tubes 18 in liquid communication with and extending perpendicularly outwardly from distribution conduit 20. Extending vertically downwardly from the interior of tubes 18 and conduit 20, and being in fluid communication with them, are a multiplicity of spaced and sized pipelets 22. Feed pipe 24 is connected in liquid communication with conduit 20. Conduit 10 has two sets of flanged connections 26 and 28 in it for ease of assembly in installing the distributor 10 in tower 14. These two flanged connections allow distributor 10 to be disassembled into three parts for ease of their passage through the small manways normally found in towers or columns.

Distributor 12 is nearly a duplicate of distributor 10. It has a plurality of rung-like distributor tubes 30 extending perpendicularly outwardly from distribution conduit 32. Extending vertically downwardly from the interiors of tubes 30 and conduit 32, and being in liquid communication with them, are a multiplicity of spaced and sized pipelets 40. Feed pipe 42 is connected in liquid communication with conduit 32. Conduit 32 has two sets of flanged connections 44 and 46 in it to aid in ease of assembly of distributor 12 in the same manner as do connections 26 and 28 in conduit 20 of distributor 10.

As can be seen from FIGS. 1-4, the rung-like distributor tubes 18 of distributor 10 are spaced the same distance from each other as are the distributor tubes 30 of distributor 12. However, distributor tubes 18 are offset from distributor tubes 30 so that they are positioned midway over the spaces located between distributor tubes 30. Hence the vertically descending pipelets 22 of distributor 10 pass midway between the distribution tubes 30 of distributor 12.

This positioning of the vertical distributor pipelets 22 and 40 allows the totality of them to be spaced in a uniform distribution pattern as can be observed in FIG. 4. Therein they are seen to be in a diamond pattern. Note that the pipelets 22 and 40 also descend from conduits 20 and 32, respectively, as well as from tubes 18 and 30, respectively.

The pipelts 22 and 40 are sized in two different ways to better contribute to uniform flow. The use of pipelets allows the sizing of the length of the pipelets as well as their interior cross-sectional area. This gives an extra dimension of flow control not found in commercially available orifice and weir type distributors.

In the embodiments shown in FIGS. 1-5, distributor 10 is spaced above distributor 12, and distributor 10 is positioned with this spacing by having it upheld by a ring support 48. Ring support 48 is welded to tower 14. Distributor 12 is likewise maintained in its position by ring support 50 which is also welded to tower 14. It is not necessary to use ring support 48 to support distributor 10, for distributor 10 could rest on spread apart spacer bars (not shown) which in turn could rest on distributor 10. Such spacer bars could be of many shapes. Distributor 10 can rest directly on top of distributor 12 if flanged connectors 26, 28, 44 and 46 are arranged so as not to interfere with the positioning of the two distributors. Of course, these flanged connections need not even be present in many applications. Consideration of the pressure drop allowable in the vapor as it flows between the distributors is the controlling factor in determining how close to space the upper distributor 10 above the lower distributor 12.

The distributor tubes 18, 30 of both distributors 10 and 12 are preferred to be made large enough so that they can contain a substantial amount of liquid with respect to the amount of liquid flowing through their hollow pipelets 22 and 40. That is, when one distributor is not being fed with liquid to be distributed while the other one is, then the tubes of the unfed distributor will contain enough liquid to allow their pipelets to continue to allow liquid to continue to flow from the pipelets for a considerable time. Preferably this time is longer than the time period in which the distributor is not fed the liquid.

A less preferable option for the two ladder-type distributors than the two shown is the omission of hollow pipelets 22 and 40, and their replacement with orifices in the bottoms, sides, or tops of the distributor tubes. And, of course, the distributor tubes need not be square in cross-section as shown. They could have a round, rectangular or any other conveniently made cross-section. However, it is much easier to screw the threaded-ended pipelets 22, 40 into topped tubes in a sealable fashion when the bottom of the tubes where the orifice tops are made are flat.

The alternating feeding means to the distributors 10 and 12 of FIGS. 1-5 is seen in FIG. 1 to be comprised of a feed pump 52, a pump input line 54, a pump output line 56, a three-way switching valve 58, and a valve actuator (solenoid here) 60. A conventional flow-controller (not shown) is usually present in line 56 to control the output of pump 52. Ordinarily, pump 52 is operated at a constant flowrate.

The preferred system of this invention operates as follows. Liquid to feed into the tower 10 is pumped from pump input line 54 by pump 52 through three-way switching valve 58. Valve 58 is controlled by solenoid actuator 60 so that liquid from valve 58 passes through feed pipe 42 for one-half of a liquid feeding cycle and through feed pipe 24 for the other half of the feeding cycle. A representative feeding cycle would be from about ten seconds to about one minute in duration. Solenoid 60 continues to switch valve 58 as long as the feed is desired to be alternately fed to the two distributors 10 and 12.

DESCRIPTION OF ALTERNATIVE EMBODIMENT

Figure 6:
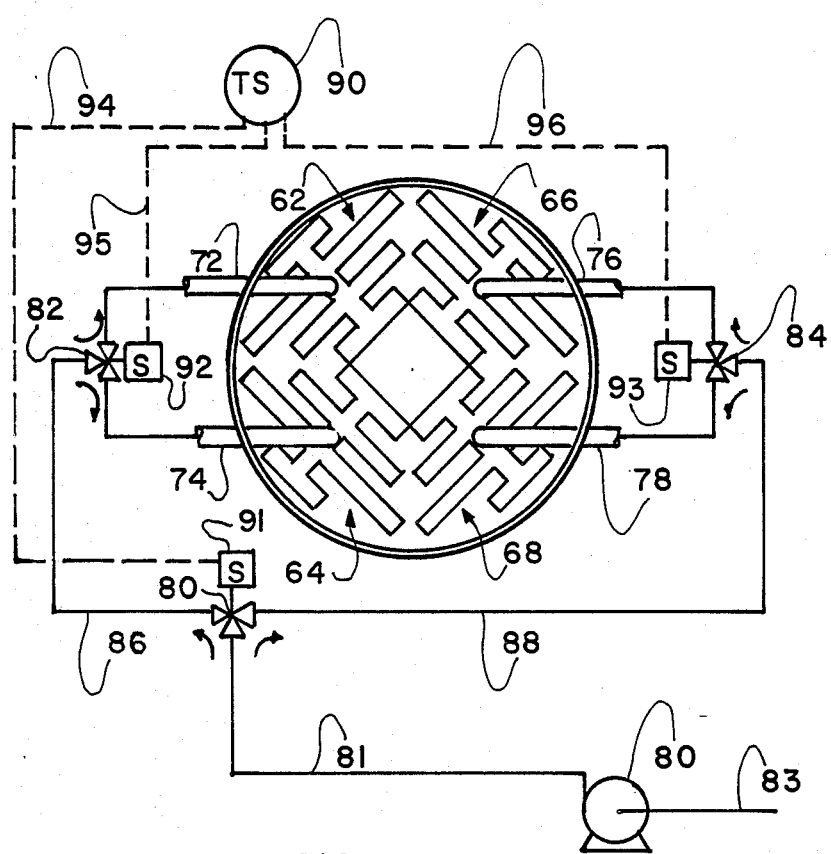
FIG. 6 is a schematic top view of an alternative embodiment of this invention showing four separate distributors covering separate regions of the tower packed bed.
Figure 7:
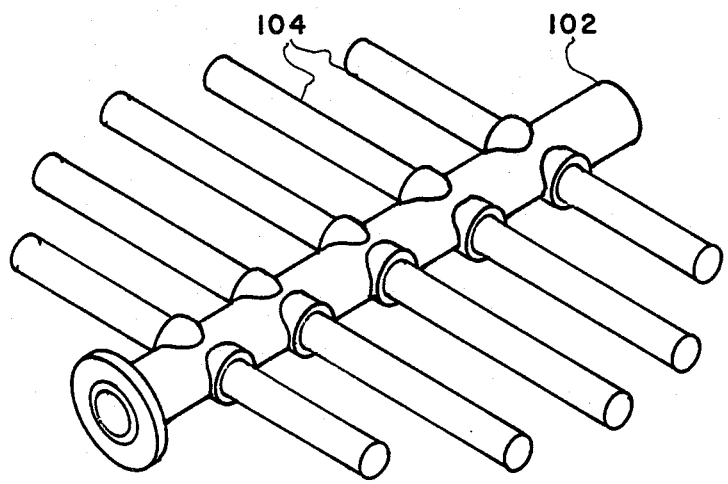
FIG. 7 is an isometric view of a commercially available prior art ladder-type distributor having a center feed conduit 102 from which spaced horizontal rung-like distribution tubes 104 extend and in the bottom of which tubes 104 there are a multiplicity of spaced orifices (not seen) through which liquid is distributed within the tower.
Figure 8:
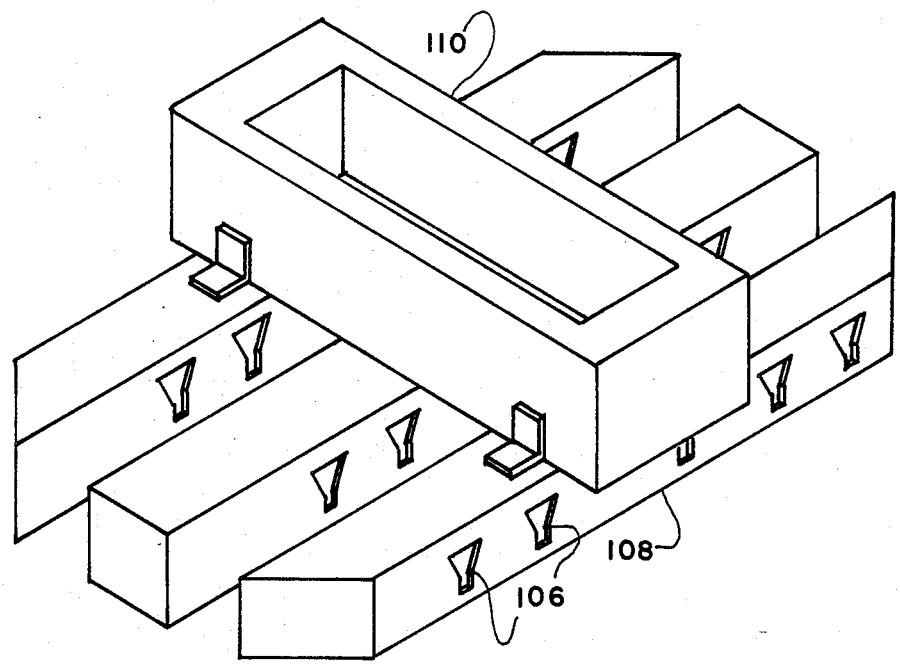
FIG. 8 is an isometric view of a commercially available, prior art wier trough distributor having wier distribution points 106 cut in the sides of troughs 108, which troughs receive their liquid from parting boxes 110.
Figure 9:
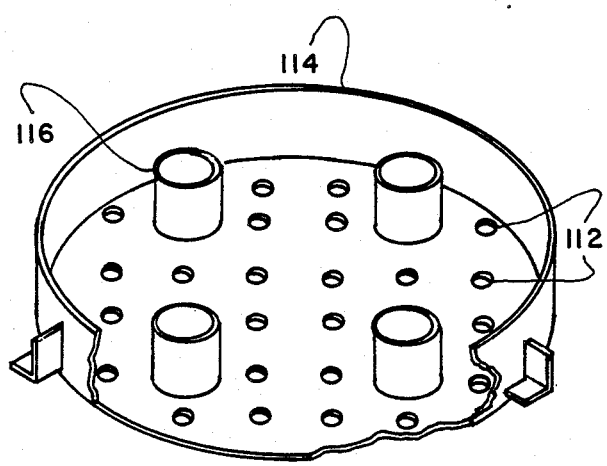
FIG. 9 is a partially broken-away, isometric view of a commercially available, prior art orifice-type distributor which allows the downward distribution of liquid through orifices 112 cut in the bottom of pan 114 and which allows the upward passage of vapors through riser 116.
Figure 10:
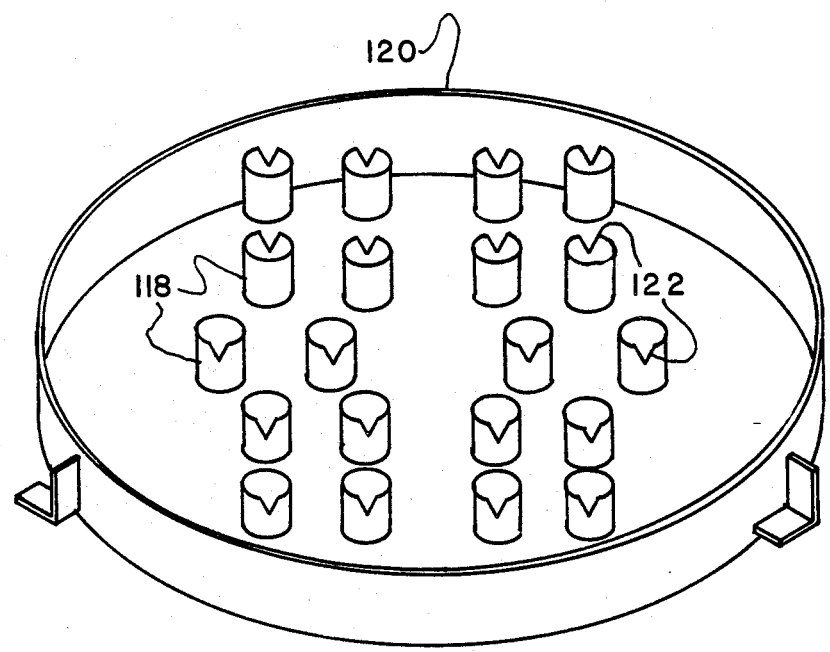
FIG. 10 is an isometric view of a commercially available, prior art wier-riser type of distributor wherein vapors pass upwardly through spaced risers 118 and liquid collects in pan 120 until it spills over through the V-shaped wiers 122 cut in the tops of risers 118 and flows downwardly through risers 118.

An alternative embodiment of this invention is shown in FIG. 6. Therein the tower 70 can be seen to be divided into quadrants or regions by four separate ladder-type liquid distributors 62, 64, 66, 68 situated at the same height in tower 70. Each distributor 62, 64, 66, 68 has its own feed pipe 72, 74, 76, 78, respectively.

Pump 80 continuously pumps liquid to be distributed in tower 70 sequentially through pipe 81 from pipe 83 to feed pipes 72, 74, 76, 78 for the same amount of time in one time cycle of liquid feeding by a combination of three 3-way switching valves 80, 82, 84. Valve 80 alternately feeds valves 82 and 84 through pipes 86 and 88, respectively. Valve 82 alternately feeds distributors 62 and 64 through pipes 72 and 74, respectively. Valve 84 alternately feeds distributors 66 and 68 through pipes 76 and 78, respectively.

The alternation of the feeding of the distributors is accomplished by timer switch 90. Timer switch 90 actuates the solenoid valve switches 91, 92 and 93 via electric lines 94, 95 and 96, respectively. Preferably the switch 90 swtiches valves 80, 82 and 84 according to the following sequence. First, valve 80 is switched so that liquid flows from it through pipe 86 to valve 82 for half of one of the repeating time feeding cycles of valve 80. The liquid flowing through valve 82 is first switched to flow through pipe 72 by solenoid 92 and then it is switched to flow through pipe 74. The flow through pipe 72 is preferably of equal amount and of equal time duration as the flow through pipe 74. While liquid if flowing through line 86, there is no flow through line 88 and vice versa. Similarly there is no flow through pipe 72 when there is flow through pipe 74 and vice versa. The same is true with valve 84. When there is flow through pipe 76 there can be no flow through pipe 78.

After one-half time cycle, valve 80 is switched so that the liquid stops flowing to valve 82 and starts flowing to valve 84 through pipe 88. The liquid flows on from valve 84 to distributor 66 through pipe 76 for half of this time. Then for the remaining half of this time, the liquid flows from valve 84 to distributor 68 through pipe 78. Having finished one feeding cycle, valve 80 then switches back to feeding liquid to valve 82 to start a new cycle. Thus in one cycle, distributors 62, 64, 66 and 68 are sequentially fed liquid in equal amounts for equal time periods, and then the cycle is repeated indefinitely.

Those skilled in the art will appreciate the many other combinations of feeding sequences, feeding times, positioning of distributors, and types and numbers of distributors available when using the present inventive concept of alternate or sequential feeding of a plurality of separate liquid distributors which are positioned at substantially the same height in a tower where the liquid is to be distributed.

Accordingly what is claimed as the present invention is:

1. A method of continuously distributing liquid within a packed, fluid-liquid contact tower which comprises continuously cyclically feeding the liquid to be distributed to at least two separate liquid distributors each having a plurality of outlet openings disposed at substantially the same height within the tower and positioned over a bed of column packing in the tower, wherein one feeding cycle includes feeding liquid to be distributed to at least one distributor for a predetermined amount of time while at least the other distributor is not being fed with the liquid, switching the liquid feed from the one distributor to the other distributor, and then feeding the other distributor for a predetermined amount of time, the unfed distributor containing enough liquid to allow liquid to continue to flow from its said outlet openings for a time longer than the time period in which the distributor is not fed with liquid.

2. The method of claim 1 wherein the liquid to be distributed is alternately flowed under pressure to two ladder type distributors which are sufficiently disposed one above the other to allow fluid in the tower to flow between them, but yet the distributors are disposed such that they are at substantially the same height within the tower, said distributors also being disposed such that the spaced rung-like distributor tubes of the upper distributor are positioned vertically over the open spaces between the spaced rung-like distributor tubes of the lower distributor.

3. The method of claim 2 which further comprises flowing the liquid from the distributors' rung-like distributor tubes through said outlet openings comprising spaced and sized pipelets which substantially all extend vertically downwardly into the tower from the interior of the spaced tubes to substantially the same level within the tower.

4. The method of claim 1 wherein the liquid to be distributed into the tower by the distributors is alternately flowed from one distributor positioned over one region of the horizontal cross-sectional area of the tower as taken just below the distributor, to at least one other distributor positioned over another region of that cross-sectional area, said distributors being disposed such that, combined, they substantially extend across the tower and are so disposed as to be at substantially the same height within the tower.

5. The method of claim 1 wherein the liquid is flowed to one liquid distributor for one half of the feeding cycle and then the liquid flow is switched to the other liquid distributor for the other half of the feeding cycle.

6. The method of claim 5 wherein the feeding cycle is from about ten seconds to about one minute in duration.

7. A liquid distributor system for a liquid-fluid contact tower wherein a liquid is desired to be introduced into a tower in a uniform distribution pattern at a very low flowrate, said system comprising:

A. A pattern of ladder-type, liquid distributors each having a plurality of outlet opening disposed at substantially the same height within the tower and positioned over a bed of column packing in the tower, one of said distributors being disposed sufficiently above the other to allow easy passage of fluid in the tower through the two distributors, but yet both distributors being disposed at substantially the same height within the tower, said two distributors being disposed in a manner such that the spaced, rung-like distributor tubes of the upper distributor are located vertically above the spaces between the spaced-apart, rung-like distributor tubes of the lower distributor so that the liquid distributed from the upper distributor can fall between the vapor passage spaces of the lower distributor to double the liquid distributor points to accomplish simultaneously more liquid distribution across the tower horizontal cross-sectional area beneath the two distributors without reducing the upward vapor flow, and B. Means for cyclically feeding the liquid to be distributed to the two ladder-type distributors, wherein the cyclic feeding means includes a means for feeding liquid to be distributed to at least one distributor for a predetermined amount of time while at least the other distributor is not being fed with the liquid, switching the liquid feed from the one distributor to the other distributor, and then feeding the other distributor for a predetermined amount of time, the unfed distributor containing enough liquid to allow liquid to continue to flow from its said outlet openings for a time longer than the time period in which the distributor is not fed with liquid.

8. The liquid distributor system of claim 7 wherein the spaced rung-like distributor tubes of the two distributors have spaced and sized said outlet openings comprising piplets extending vertically downwardly into the tower from the spaced tubes to substantially the same level within the tower.

9. The liquid distributor system of claim 8 wherein the pipelets extend from the interior of the spaced tubes as opposed to merely extending from openings in the walls of said tubes.

10. A liquid distributor system for distributing liquid into a fluid-liquid contact tower, which system comprises:

A. At least two liquid distributors each having a plurality of outlet openings which are spaced in a substantially uniform pattern and which are uniformly sized, said distributors being disposed in the tower and positioned over a bed of column packing in the tower in a manner such that the different distributors are at substantially the same height within the tower, said distributors being disposed such that each distributor is positioned above different regions over an imaginary, horizontal, cross-sectional area of the tower taken just below the distributors, and said distributors being disposed so as to be able to cover substantially all of said cross-sectional area with a uniform distribution of the liquid fed to each of the distributors; and B. means for cyclically feedings the liquid to be distributed to the distributors in a manner such that the average flow from each said outlet opening is substantially the same as from each of the others and wherein the cyclic feeding means includes a means for feeding liquid to be distributed to at least one distributor for a predetermined amount of time while at least the other distributor is not being fed with the liquid, switching the liquid flowing from the one distributor to the other distributor, and then feeding the other distributor for a predetermined amount of time, the unfed distributor containing enough liquid to allow liquid to continue to flow from its said outlet openings for a time longer than the time period in which the distributor is not fed with liquid.

* * * * *